United States Patent
Aranzulla et al.

(10) Patent No.: US 10,710,542 B2
(45) Date of Patent: Jul. 14, 2020

(54) INFLATABLE AIRBAG FOR PROTECTING A PERSON, AIRBAG MODULE, VEHICLE OCCUPANT RESTRAINING SYSTEM COMPRISING SUCH AN AIRBAG, AND METHOD FOR PRODUCING AN INFLATABLE AIRBAG

(71) Applicant: TRW AUTOMOTIVE GMBH, Alfdorf (DE)

(72) Inventors: Daniele Aranzulla, Essingen (DE); Martin Burkhardtsmaier, Schwäbisch-Gmünd (DE); Achim Hofmann, Tüssling (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 174 days.

(21) Appl. No.: 15/738,181

(22) PCT Filed: Jun. 28, 2016

(86) PCT No.: PCT/EP2016/064919
§ 371 (c)(1),
(2) Date: Dec. 20, 2017

(87) PCT Pub. No.: WO2017/001361
PCT Pub. Date: Jan. 5, 2017

(65) Prior Publication Data
US 2018/0154858 A1    Jun. 7, 2018

(30) Foreign Application Priority Data

Jul. 2, 2015  (DE) .................. 10 2015 008 455

(51) Int. Cl.
*B60R 21/231* (2011.01)
*B60R 21/2338* (2011.01)
*B60R 21/233* (2006.01)

(52) U.S. Cl.
CPC .......... *B60R 21/233* (2013.01); *B60R 21/231* (2013.01); *B60R 2021/23308* (2013.01); *B60R 2021/23386* (2013.01)

(58) Field of Classification Search
CPC ........ B60R 21/233; B60R 2021/23386; B60R 2021/23308; B60R 21/231; B60R 21/2338; B60R 2021/23115
(Continued)

(56) References Cited

U.S. PATENT DOCUMENTS 3,843,150 A * 10/1974 Harada .................. B60R 21/231
280/729
4,076,277 A *  2/1978 Kuwakado ............ B60R 21/231
280/738
(Continued)

FOREIGN PATENT DOCUMENTS

| DE | 19816080 | 10/1999 |
|----|----------|---------|
| DE | 10119351 | 7/2002 |

(Continued)

*Primary Examiner* — Keith J Frisby
(74) *Attorney, Agent, or Firm* — Tarolli, Sundheim, Covell & Tummino LLP

(57) ABSTRACT

The invention relates to an inflatable airbag (1) for protecting a person (5), comprising a flexible cover (10) which includes at least two finger-type extensions (11), wherein the flexible cover (10) delimits a closed gas expansion compartment (12) by the finger-type extensions (11). The invention excels by the fact that the finger-type extensions (11) are arranged relative to each other such that in an inflated state the airbag (1) takes a three-dimensional shape and in the inflated state the finger-type extensions (11) at least in portions delimit a clearance (13), wherein the cover (10) is deferrable for absorbing impact energy while deforming, especially reducing, the clearance (13).

23 Claims, 9 Drawing Sheets

(58) Field of Classification Search
USPC .................................. 280/743.2, 743.1, 729
See application file for complete search history.

(56) References Cited

U.S. PATENT DOCUMENTS

| | | | |
|---|---|---|---|
| 4,500,114 A * | 2/1985 | Grey, Jr. ............... | B60R 21/231 |
| | | | 280/731 |
| 5,542,695 A * | 8/1996 | Hanson ................. | B60R 21/231 |
| | | | 280/729 |
| 7,404,575 B2 | 7/2008 | Bito et al. | |
| 2002/0105171 A1 | 8/2002 | Fellhauer et al. | |
| 2003/0230533 A1 | 12/2003 | Heym | |
| 2003/0295135 | 12/2009 | Kumagai et al. | |
| 2013/0088056 A1 | 4/2013 | Quatanens et al. | |
| 2017/0174170 A1 | 6/2017 | Aranzulla et al. | |

FOREIGN PATENT DOCUMENTS

| | | |
|---|---|---|
| WO | 2012044245 | 4/2012 |
| WO | WO 2012/044245 A1 * | 4/2012 |

* cited by examiner

INFLATABLE AIRBAG FOR PROTECTING A PERSON, AIRBAG MODULE, VEHICLE OCCUPANT RESTRAINING SYSTEM COMPRISING SUCH AN AIRBAG, AND METHOD FOR PRODUCING AN INFLATABLE AIRBAG

RELATED APPLICATIONS

This application corresponds to PCT/EP2016/064919, filed Jun. 28, 2016, which claims the benefit of German Application No. 10 2015 008 455.0, filed Jul. 2, 2015, the subject matter of which are incorporated herein by reference in its entirety.

BACKGROUND OF THE INVENTION

The invention relates to an inflatable airbag for the protection of a person. Further, the invention relates to an airbag module comprising such airbag. Finally, within the scope of the invention, a vehicle occupant restraint system comprising an airbag or an airbag module is stated. Furthermore, the invention relates to a method of manufacturing an inflatable airbag.

An airbag of the type mentioned in the beginning is known from WO 2012/044245 A1, for example. The known airbag is part of a protective device for the head of a person which includes the airbag as well as an outer cover. The airbag comprises a flexible cover having finger-type extensions, which delimits a closed gas expansion compartment, and is embedded in an outer bag made from gas-permeable material, wherein the individual fingers of the cover engage in receiving pockets of the outer bag. The outer bag is provided to predetermine the shape of the protective device in the inflated state of the airbag. In other words, the outer bag restricts the expansion of the inner airbag, especially of the finger-type extensions of the inner airbag. This ensures that the protective device takes the desired shape in the inflated state, in the known protective device this shape is configured especially in the way of a bicycle helmet so that the inflated airbag encloses the person's head like a helmet.

It is a drawback of the known protective device that a relatively great effort has to be made to manufacture the inner airbag and the outer bag. The functional separation of the inflatable airbag and the shaping outer bag results in a relative complex design of the protective device and increases the production expenditure. Finally, this results in increased manufacturing costs.

In the protective device known from the state of the art it is necessary that in the case of operation all finger-type extensions have to be inflated with gas. If the concept of WO 2012/044245 A1 is applied to vehicle occupant restraint systems, it is necessary to provide an inflator which fills all finger-type extensions of the inflatable airbag with gas, with the finger-type extensions forming a relatively large gas expansion compartment.

SUMMARY OF THE INVENTION

It is the object of the invention to state an inflatable airbag for protecting a person which has a simple structure and can be produced at low manufacturing cost. Moreover, a further developed inflatable airbag is intended to be filled by smaller and especially lighter inflators. Furthermore, it is the object of the invention to state an airbag module, a vehicle occupant restraint system end a method of manufacturing an inflatable airbag.

In accordance with the invention, this object is achieved with respect to the airbag by the subject matter of the claims, with respect to the airbag module by the subject matter of the claims, with respect to the vehicle occupant restraint system by the subject matter of the claims and with respect to the method of manufacturing an inflatable airbag by the subject matter of the claims.

The invention is based on the idea to state an inflatable airbag for protecting a person which includes a flexible cover comprising at least two finger-type extensions. The flexible cover delimits a closed gas expansion compartment by said finger-type extensions.

In accordance with the invention, the finger-type extensions are arranged relative to each other so that in an inflated state the airbag takes a three-dimensional shape and in the inflated state the finger-type extensions at least in portions delimit a clearance, wherein the cover is deformable to absorb impact energy while deforming, especially reducing, the clearance.

In total, the entire airbag may take a three-dimensional shape which is evident from a bulge of the entire cover. Due to the clearance formed, upon a person's impact on the inflated airbag the impact energy is absorbed not only by displacement of the gas disposed inside the airbag but also by deformation of the coven wherein upon a persons impact the clearance will be deformed, especially reduced. The three-dimensional shape helps stabilizing the airbag.

Due to the three-dimensional shape of the airbag and due to the formation of a clearance which need not be filled with gas of an inflator, the airbag volume and, resp., the gas expansion compartment is smaller than in conventional airbags. The airbag substantially reproduces only the outer sheath of a conventional airbag by the three-dimensional shape and absorbs the impact energy not only by gas displacement but also by airbag deformation. This enables smaller inflators to be used, which is also accompanied by advantageous weight reduction.

Preferably, the finger-type extensions are connected, especially sewn and/or glued and/or welded, to each other so that the finger-type extensions may be arranged relative to each other in such manner that the airbag adopts a three-dimensional shape in an inflated state, in a manufacturing state, the finger-type extensions of the flexible cover are preferably spaced apart from each other at least in portions. This manufacturing state may be, for example, the cut of one or more fabric layers of the cover. Especially in the case of two substantially congruent textile cuts, the latter may be sewn to each other along their edges, wherein advantageously the two fabric layers or textile cuts of the cover can be sewn when being flatly spread in a first sewing procedure. Thus, automatic sewing is considerably facilitated at least for a first manufacturing step.

Since the finger-type extensions are preferably interconnected, gaps between the finger-type extensions are closed and, in this way, the cover and, resp., the airbag is urged into a three-dimensional shape. In response to the shape of the individual finger-type extensions or the textile cutouts and, resp., textile recesses between the finger-type extensions, different geometries of the inflatable airbag can be produced.

The finger-type extensions may form a star shape or flower shape or fan shape in a manufacturing state of the cover. It is especially imaginable that the finger-type extensions in this manufacturing state are formed to be bent in a common direction of rotation.

The finger-type extensions may be connected to each other by sewing, for example. In general, the finger-type extensions are preferred to be directly connected to each other so that the finger-type extensions are directly adjacent each other. By ripping the connection, the manufacturing state of the airbag becomes evident. In this manufacturing state, the finger-type extensions of the cover are preferably provided to be spaced apart from each other at least in portions. In other words, between the individual fingers preferably a textile cutout is provided. Said textile cutout may be formed by removing textile material. When manufacturing the airbag, the individual fingers are drawn together and are directly connected to each other, thus causing the cover to bulge and, resp., curve or generally adopt a three-dimensional geometry. The latter becomes evident especially in the inflated state of the airbag. In other words, it is possible that the three-dimensional shape of the inflated airbag is defined by the connection of the finger-type extensions of the cover.

Preferably, the finger-type extensions are connected, especially sewn and/or glued and/or welded, to each other along their entire length. The finger-type extensions form chambers of the closed gas expansion compartment, wherein the individual chambers are delimited by the connecting lines between the finger-type extensions, especially the seams between the finger-type extensions interconnecting the extensions. Improved stability of the airbag is obtained in that the finger-type extensions are interconnected along their entire length. The flexible cover of the airbag according to the invention may be manufactured in different ways.

On the one hand, the cover may be formed in one piece, especially woven in one piece. The cover may be seamless in this respect. This may be implemented, for example, by weaving the cover by OPW ("one piece woven") technique.

As an alternative, the cover may be provided to be formed by at least two textile cuts which are tightly connected, especially sewn and/or glued and/or welded, to each other at their edges to form the closed gas expansion compartment. The textile cuts preferably comprise two or more finger-type extension tabs spaced apart from each other which form the finger-type extensions by the connection at their edges. Manufacture of the airbag by two textile cuts which are interconnected at their edges is especially facilitated and permits a complex geometry and, resp., outer contour of the cover. For better readability, within the scope of the present application both the (flat) extension tabs of the textile cuts which later, i.e. in a subsequent manufacturing stage, will form the finger-type extensions of the cover and the finger-type extensions of the cover which will provide a gas expansion compartment in the form of chambers shall be referred to as "finger-type extensions" of the cover or the textile out, respectively.

The textile cuts are preferred to be designed identically, especially as regards the geometry and shaping thereof. The textile cuts may be flatly put on top of each other and interconnected at their edges so as to form the flexible, preferably at least temporarily gastight cover.

In general, the cover may be provided to include an at least temporarily gas-impermeable material. The cover may substantially be made from a material which retains gas within the gas expansion compartment at least for a predetermined period of time. The period has to be dimensioned so that efficient protection of a person is ensured during crash. After the airbag and, resp., the cover has absorbed the impact energy, loss of gas e.g. by diffusion through the cover material is acceptable. However at least temporarily, viz. over the predetermined period of time, the material of the cover preferably is gas-impermeable.

If in a manufacturing state of the cover the finger-type extensions form a star shape or flower shape or fan shape, it is possible that the cover is point-symmetric or socially symmetric in a flat manufacturing state. In other words, the textile cuts used for forming the cover may have a point-symmetric or axially symmetric outer contour. In the case of a point-symmetric geometry, the finger-type extensions of the cover or the extension tabs of the textile cuts ere oriented radially toward a center of the cover and, resp., preferably extend radially outwardly starting from a center of the cover, in the case of axially symmetric geometry, the individual finger-type extensions may point laterally away from a central axis of the cover, with finger-type extensions complementary or congruent to each other being provided on both sides of the central axis. This entails a uniform three-dimensional shape of the inflated airbag which is desired in plural fields of application.

In the inflated state the cover may adopt a bowl-shaped or semicircular or groove-shaped or shell-shaped contour. A hood-shaped or C-shaped contour of the cover in the inflated state is also possible. Especially preferred is a shell-shaped contour of the cover in the inflated state.

The cover may include an upper side and a lower side, wherein the upper side preferably covers a larger area than the lower side in the inflated state of the cover. Each of the upper side and the lower side may be concavely or convexly curved. In particular, the upper side and the lower side may be curved to the same direction.

Especially when the upper side and the lower side are equally curved, the three-dimensional shape of the airbag results in a larger surface area required for the upper side than for the lower side.

In the inflated state the finger-type extensions may form an outer sheath which at least in portions surrounds the clearance. Especially the lower side of the cover may delimit the clearance. Thus, especially the lower side of the cover thus defines the geometric shape of the clearance. Preferably, the finger-type extensions in the inflated state form an outer sheath which completely surrounds a clearance.

In another embodiment of the invention it is possible that the outer sheath formed by the finger-type extensions includes such interruption that an opening to the clearance is provided. If a clearance is formed in the area of the lower side of the airbag or the cover, the cover may be arranged to be at least partially spaced apart from components inside a vehicle, for example. Therefore, when a person hits the airbag, the impact energy is absorbed not only by displacement of the gas disposed inside the airbag but also by deformation of the cover, with the clearance being preferably reduced in the area of the lower side. Consequently, the three-dimensional shape of the cover contributes to the stability of the airbag, as due to the absorption of impact energy by way of deformation of the cover the seams of the airbag are subjected to a lower load.

The inflatable airbag preferably is designed and/or dimensioned so that the airbag in the inflated state bears against a surface of the vehicle. Such surface may be, depending on the field of application and depending on the mounting position of the airbag, an oddments tray and/or a glove box lid and/or an instrument panel and/or a vehicle backrest and/or a side window and/or a windshield and/or a steering wheal rim.

The inflatable airbag according to the invention may include a tension element connected, especially sewn and/or glued and/or welded to the cover, wherein the tension element stabilizes the shape of the clearance in the inflated state of the cover. The shape of the airbag in the inflated state thus cannot only be determined by the geometric configuration and connection of the finger-type extensions but also by connecting a tension element to the cover.

The tension element prevents the clearance from being completely flattened, when a person hits the airbag, and causes the three-dimensional basic shape of the inflated airbag to be maintained at least temporarily. Due to the tension element, the clearance acts as an additional absorption area of the impact energy. The tension element helps prevent the finger-type extensions from fanning out.

The tension element may be a tether and/or a tension belt and/or a tension cloth. Tethers or tension belts are understood to be such tension elements which have a relatively small width in relation to the total area of the cover. The length of a tether or a tension belt is preferably larger than the width thereof. Tension cloths basically have a larger surface area as compared to surface areas of tension belts or tethers.

The tension element may be connected, especially at the lower side of the cover, to at least two ends of finger-type extensions. It is also possible that the tension element is connected at the upper side of the cover to at least two ends of two finger-type extensions. Between the finger-type extensions, especially between the ends of the finger-type extensions, a tension force is obtained in the inflated state of the airbag by virtue of the connected tension element. The two ends of finger-type extensions consequently are tensioned relative to each other. The three-dimensional shape, especially the bowl shape or hemispherical shape or groove shape or shell shape or C-shape, is stabilized by virtue of the connected tension element. When a person hits the three-dimensionally shaped inflated airbag, the basic shape of the three-dimensional shape is retained.

In another embodiment of the invention, the tension element may form a segment of the outer sheath. The outer sheath delimits the clearance, as already mentioned before. The tension element in this embodiment may be fastened, inter alia, on the upper side of the cover. Preferably, the tension element in this embodiment is in the form of a tension cloth. Moreover, it is possible that the tension element is connected to all ends of finger-type extensions. The end of a finger-type extension is understood to be the end which is maximally distanced from a center point in a manufacturing state. Accordingly, the end of a finger-type extension is understood to be the fingertip-like end of the finger-type extension.

The tension element may close an opening of the clearance at least in portions, especially completely. The clearance in this case is delimited, on the one hand, by the outer sheath formed by the finger-type extensions and, on the other hand, by the tension element. The finger-type extensions and the tension element form a substantially closed clearance that is not to be filled with gas generated by an inflator.

Moreover, the tension element may be connected to at least two finger-type extensions forming the lateral end portions of the three-dimensional shape formed in the inflated state of the cover. Lateral end portions are understood to be, for example, the finger-type extensions constituting the laterally outermost finger-type extensions when a three-dimensional shell shape or C shape is formed. This is evident especially when pressing apart or flattening the three-dimensional shape, it is possible that here extensions are concerned which substantially extend along the longitudinal vehicle axis and which are configured to be closest to the respective longitudinal sides of the vehicle body.

The tension element causes said two finger-type extensions to be pulled toward each other in the inflated state so that said two finger-type extensions do not migrate to the outside so that the clearance is not flattened. The tension element preferably is to be made from tear-resistant material. This material may be gas-permeable material. The tension element may be a netted or mesh fabric. Due to the gas-permeable material, the air present in the clearance is intended to escape in a controlled manner through the gas-permeable material of the tension element when a person hits the airbag.

According to an independent aspect, the invention is based on the idea to state an airbag module comprising an afore-described inflatable airbag and an inflator connected to the inflatable airbag.

The inflator may be arranged, for example, in a central gas distributing area of the cover from which the finger-type extensions start out. This ensures the gas generated in the inflator to be distributed quickly and evenly over the finger-type extensions and, resp., the chambers formed by the finger-type extensions. In this way, uniform expansion of the airbag is resulting, which is desired in plural fields of application.

Alternatively, it is imaginable that the inflator is disposed in an introducing portion or inflow portion of the airbag. A second portion of the inflatable gas cover is connected to the introducing portion or inflow portion, with said second portion including the at least two finger-type extensions. In this case, a first expansion of the airbag will occur in the introducing portion or, resp., in the inflow portion, with the gas generated by the inflator being guided, starting from said introducing portion, into the finger-type extensions.

Another independent aspect of the invention relates to a vehicle occupant restraint system comprising an afore-described inflatable airbag or the afore-described airbag module. Such vehicle occupant restraint system may be integrated, for example, in automotive vehicles, preferably in multi-track vehicles such as cars or trucks.

The airbag described here is suited for various applications. Especially, a vehicle may be equipped with such inflatable airbag, wherein the inflatable airbag may be integrated in different vehicle parts. For example, a steering wheel for a vehicle may be configured to comprise such airbag or such airbag module, with the airbag being configured and/or dimensioned so that in the inflated state the airbag bears on a steering wheel rim of the steering wheel. In this respect, the steering wheel rim forms a counter-bearing and supports the airbag so that the latter may absorb impact energy by gas displacement.

A similar principle is pursued with an instrument panel for a vehicle comprising such inflatable airbag or airbag module, wherein the inflatable airbag may be configured and/or dimensioned so that the airbag in the inflated state bears on an oddments tray and/or at least in portions on an instrument panel surface and/or on a gloves compartment lid of the instrument panel. In other words, the inflatable airbag may take a curved or bulged three-dimensional shape so that the airbag contacts the instrument panel with its lower side or the opening toward the clearance.

Furthermore, a back seat or a rear bench seat for a vehicle may be equipped with an inflatable airbag according to the invention or an airbag module according to the invention, wherein the airbag according to the invention may be configured and/or dimensioned so that in the inflated state the airbag extends between two seating areas in the longitudinal vehicle direction, in this application, the airbag substantially forms an interactive bag preventing two persons seated on the back seat or the rear bench seat from colliding.

In addition, a vehicle seat for a vehicle may be equipped with an inflatable airbag according to the invention or with an airbag module according to the invention, the airbag being configured and/or dimensioned so that in the inflated state the airbag extends between a backrest and a front support surface. The front support surface may be, in the case that the vehicle seat is a front row seat, an instrument panel and/or a windshield and/or a steering wheel. If a vehicle seat of the second or rear seat row is configured to include an airbag according to the invention and/or an airbag module according to the invention, the front support surface may be the backrest of a vehicle seat of the front or first seat row, in this application, the airbag substantially protects a person against impact on a front support surface, especially an instrument panel and/or a steering wheel and/or a backrest of a vehicle seat located in front of him/her in the driving direction.

Further, a window frame or a roof lining for a vehicle may include an inflatable airbag according to the invention or an airbag module according to the invention, with the airbag according to the invention being configured and/or dimensioned so that the airbag in the inflated state stretches over the windshield or over a side window of the vehicle. Such side airbag or roof airbag protects a person against impact on the side window or on the windshield and, in this way, reduces the risk of injury.

In the case of a window airbag it is possible that the inflatable airbag according to the invention in the inflated state is spaced apart from the side window at least in portions so that a clearance is formed between the side window and the airbag, in particular, the airbag may be curved toward the interior of the vehicle in the inflated state. Especially a lower side of the airbag is curved toward the interior of the vehicle. In this way, a clearance preferably decreasing while the airbag deforms is formed between the side window and the airbag, especially between the side window and the lower side of the airbag. In the event of impact, the impact energy is absorbed not only by displacement of the gas volume, especially of the airbag, but also by the deformation, especially decrease, of the airbag, with the clearance between the side window and the airbag being reduced.

One independent aspect of the invention relates to a method of manufacturing an inflatable airbag, especially an inflatable airbag according to the invention, the method comprising the following steps of:

providing at least one cover that includes finger-type extensions, wherein textile cutouts are formed between the finger-type extensions such that the finger-type extensions are spaced apart from each other at least in portions, closing the textile cutouts and connecting, especially sewing and/or gluing and/or welding, adjacent finger-type extensions to each other for forming a three-dimensionally shaped cover, connecting, especially sewing and/or gluing and/or welding, a tension element to the cover.

For providing at least one cover, in a preceding method step the flat shape of an intermediate fabrication step of the cover can be formed. It is possible for this purpose that at least two textile cuts are flatly put on top of each other and the edges of the textile cuts are connected, especially sewn and/or glued and/or welded, to form the cover. The textile cuts include finger-type extensions, with textile cutouts being formed between the finger-type extensions such that the finger-type extensions are spaced apart from each other at least in portions. It is possible that the textile cuts are formed identically. The described textile cutouts may be substantially V-shaped.

Alternatively, it is possible to provide a cover which is woven in one piece, especially woven by OPW ("one piece woven") technique. Weaving of the cover is a method step which precedes providing the at least one cover.

BRIEF DESCRIPTION OF THE DRAWINGS

Hereinafter the invention shall be illustrated by way of embodiments with reference to the enclosed schematic drawings, wherein:

FIG. 1b shows a sectional representation of the airbag according to FIG. 1a;

FIG. 1c shows a textile cut for a cover of an airbag according to the invention as set forth in FIG. 1a;

FIGS. 5b, 5c show possible textile cuts of a cover of an airbag for forming a driver airbag according to FIG. 5a.

DESCRIPTION

Each of the enclosed Figures illustrates an inflatable airbag 1 that serves for the protection of a person especially in road traffic. The illustrated airbags are in the form of airbags 1 integrated in a vehicle.

Figure 1A:
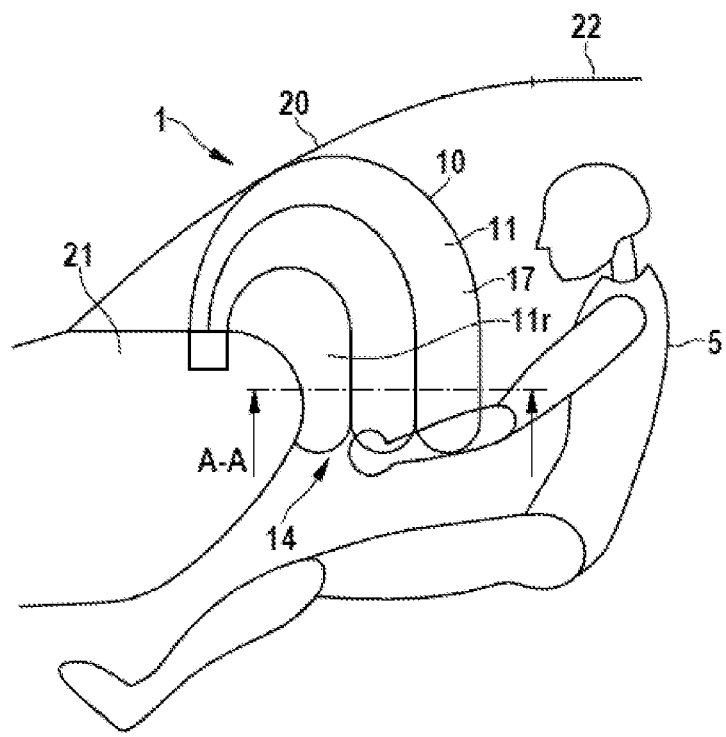
FIG. 1a shows an inflatable airbag according to the invention, the airbag being a passenger airbag.

FIG. 1a shows an inflatable airbag 1 serving for the protection of a passenger. The airbag includes a flexible cover 10 which in the shown example has plural finger-type extensions 11.

Figure 1B:
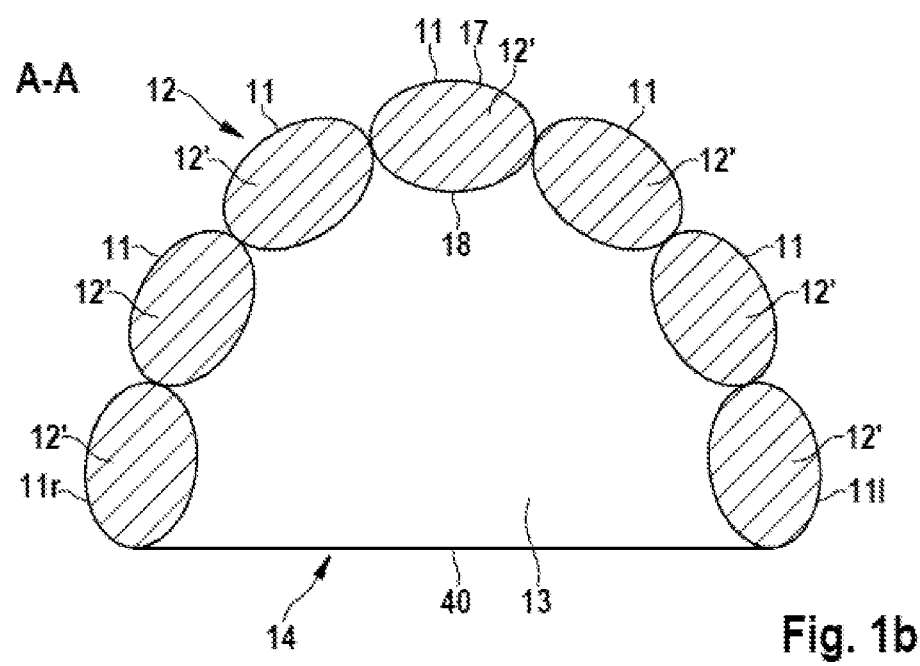

From the cross-sectional view according to FIG. 1b it is evident that the finger-type extensions 11 delimit a closed gas expansion compartment 12. The gas expansion compartment 12 is formed of plural gas expansion compartment portions 12'. The finger-type extensions 11 are arranged relative to each other so that in the shown inflated state the airbag 1 takes a three-dimensional shape and the finger-type extensions 11 in said inflated state at least in portions delimit a clearance 13. The flexible cover 11 is deformable for absorbing impact energy while deforming, especially reducing, the clearance 13. The three-dimensional shape of the inflated airbag 1 corresponds to a shell shape. The opening 14 of the shell shape in the shown example according to FIG. 1a is formed in the direction of the legs of the vehicle occupant 5. The three-dimensional shape of the airbag 1 is dimensioned so that the flexible cover 10 bears both on the windshield 20 and on a portion of the instrument panel 21.

Figure 1C:
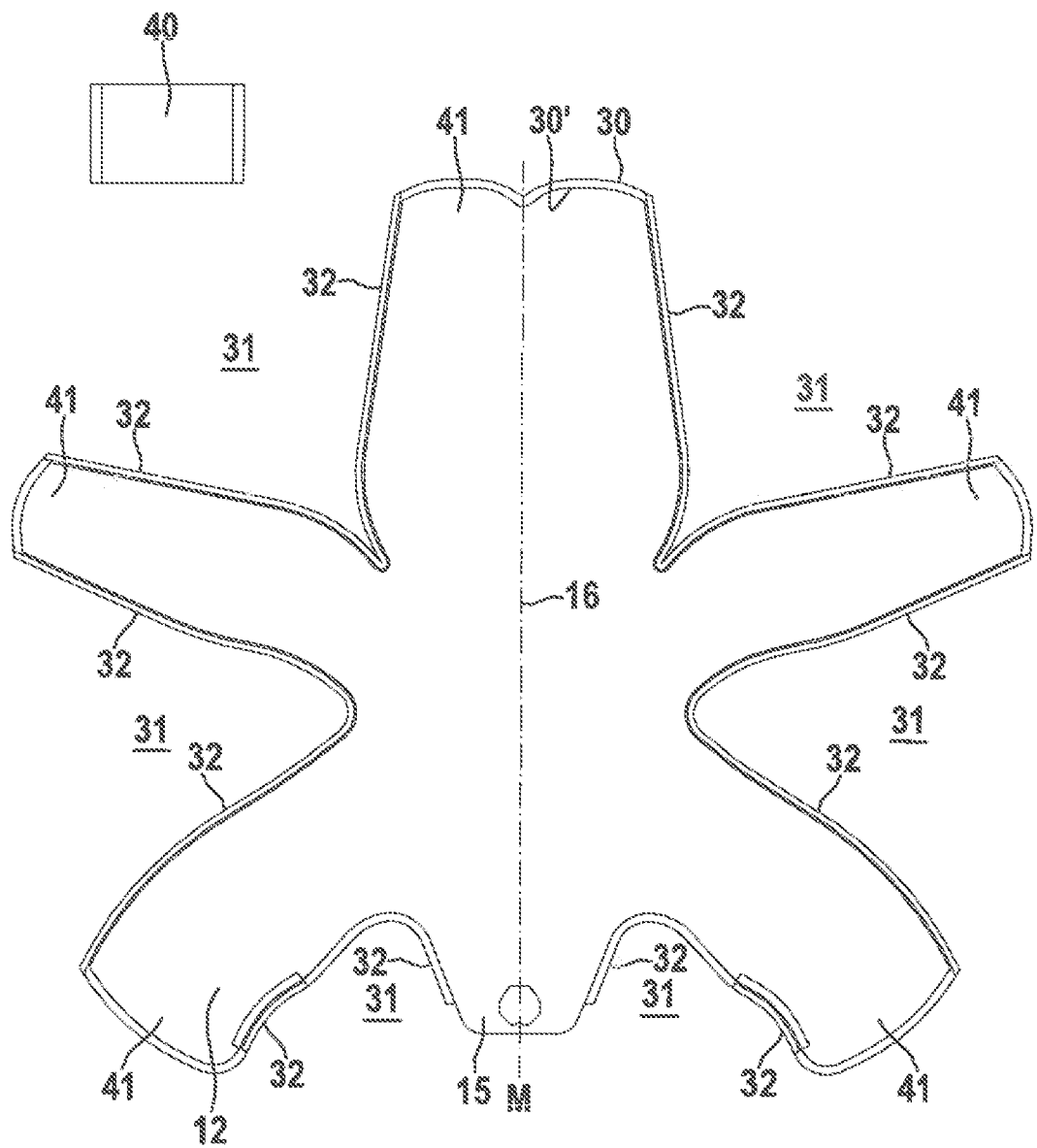

In general, it is applicable to all embodiments that the airbag 1 includes a flexible cover 10, with the flexible cover 10 comprising plural finger-type extensions 11. FIG. 1c illustrates a cover 10 formed of two superimposed textile cuts 30 and 30'. The superimposed textile cuts 30, 30' are connected to each other at their edges 32. For example, the textile cuts 30 and 30' flatly put on top of each other are sewn and/or welded and/or glued to each other at their edges 32. The finger-type extensions 11 are separated from each other by textile cutouts 31 in the illustrated manufacturing state of the flexible cover 10. In the manufacturing process, the finger-type extensions 11 spaced apart from each other are interconnected so as to close the textile cutouts 31 and, resp., the gaps between the finger-type extensions 11. The connection can be made by gluing and/or sewing and/or welding or other connecting techniques.

The textile cuts 30, 30' in the shown example are substantially identical. The textile cuts 30, 30' include extension tabs which in the joined manufacturing state form the finger-type extensions 11. The textile cutouts 31 are delimited between the finger-type extensions 11 by the seams at the edges 32. Two opposite seams are subsequently combined so as to close the gap formed by the textile cutout 31. Along the outer edge seams the finger-type extensions 11 now are sewn to each ether so that the cover 10 and, resp., the airbag 1 are achieved to take the three-dimensional shape in the inflated state.

The finger-type extensions 11 form directly adjacent gas expansion compartment portions 12' which are part of the gas expansion compartment 12 and of the cover 10. The cover 10 encloses said gas expansion compartment 12 which fills with gas upon activation of the airbag and, resp., of an inflator 50 connected to the airbag 1. Since the finger-type extensions 11 are initially arranged to be spaced apart from each other and are adjacent to each other only when they are combined and connected to each other, a three-dimensional shape of the airbag 1 is resulting. The three-dimensional shape is obvious in the curvature of the airbag 1.

In the illustrated example (FIG. 1a) the airbag 1 is bulged out in arc shape or shell shape in the direction of a vehicle occupant 5 to be protected so that part of the impact energy is not dissipated by gas displacement inside the airbag 1 but also by "bending back" the entire airbag 1.

The textile cuts 30, 30' substantially have a "spider" structure, with the finger-type extensions 11 being arranged to be axially symmetric to a center axis M of the textile outs 30, 30' and of the cover 10, respectively. Through an opening portion 15 of the cover 10 gas being generated by an inflator can be properly distributed over all finger-type extensions 11. The four lateral extensions 11 are arranged at an angle with the center axis M. Opposed to the opening portion 15, a finger-type extension 11 having a separating seam 16 is formed. Said finger-type extension 11 is configured in direct extension of the opening portion 15.

It is evident from FIG. 1b that the cover 10 has an upper side 17 and a lower side 18, the upper side 17 in the shown inflated state of the cover 10 having a larger surface area than the lower side. The clearance 13 is delimited especially by the lower side 18 of the cover 10. The finger-type extensions 11 in total form an outer sheath which at least in portions surrounds the clearance 13 in the inflated state.

Moreover, it is evident from FIG. 1b that a tension element 40 is connected, especially sewn and/or glued and/or welded, to the cover 10, the tension element 10 stabilizing the shape of the clearance 30 in the inflated state of the cover 10. The tension element 40 in the shown example is a tension belt and is connected to two finger-type extensions 11l and 11r. The two finger-type extensions 11l and 11r form the lateral end portions of the three-dimensional shape formed in the inflated state of the cover 10. By virtue of the tension element 40 connected to the cover, the two finger-type extensions 11l and 11r are tensioned relative to each other if a vehicle occupant 5 impacts on the upper side 17, the finger-type extensions 11l and 11r thus are not moved abruptly apart from each other. Rather, the two finger-type extensions 11l and 11r are retained at least temporarily in their connection being tensioned and acting relative to each other. The tension element 40 may be made from gas-permeable material. It may especially be a mesh or netted fabric.

In FIG. 1c a cut of a corresponding tension element 40 is shown.

Figure 1D:
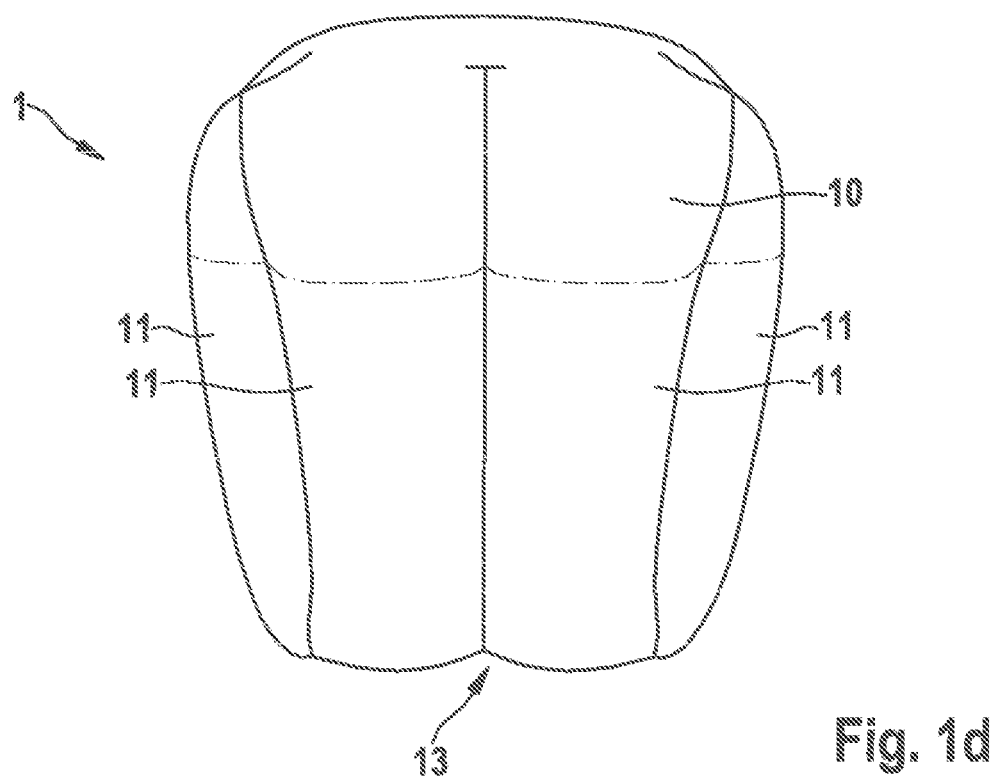
FIG. 1d-1h show various views onto the inflated airbag configured as passenger airbag.

In FIG. 1d the airbag 1 and the flexible cover 10 are shown in the inflated state. This embodiment substantially corresponds to the embodiment according to FIG. 1a.

FIG. 1d shows the view onto an airbag 1 from a passenger' perspective. Here the upper side 17 of the cover 10 is visible. Equally visible are the finger-type extensions 11. They are formed substantially in parallel to each other. Due to a tension element 40 formed (not shown here) the flexible cover 10 in the inflated state is retained in the shown three-dimensional shell shape, inside the flexible cover 10 a clearance 13 (according to FIG. 1b) is formed.

Figure 1E:
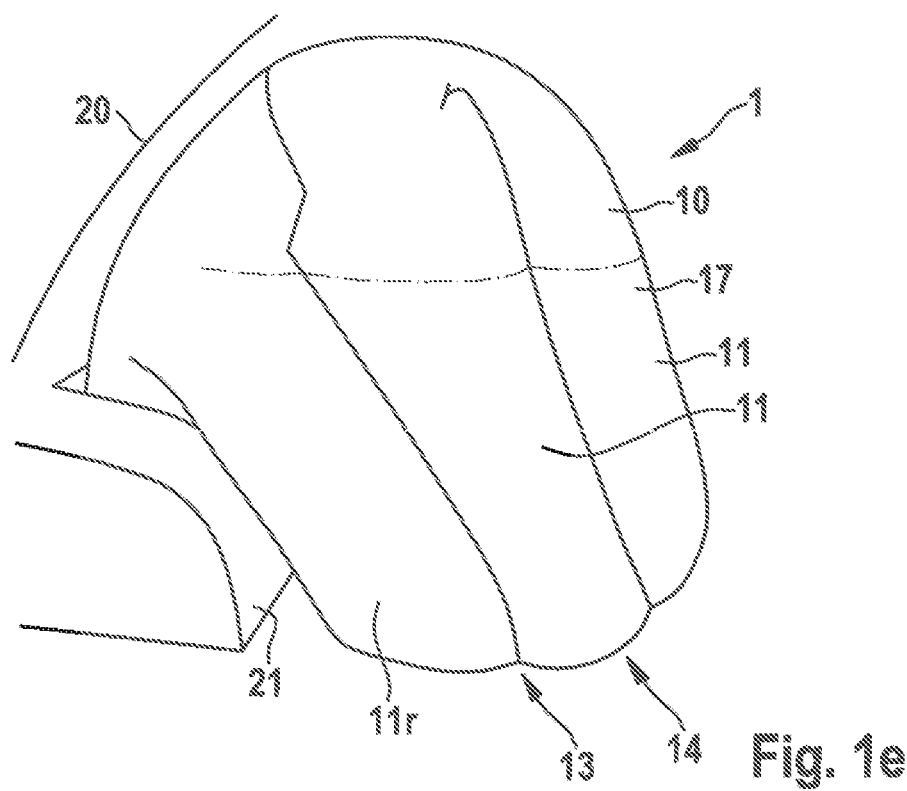

FIG. 1e illustrates the same airbag 1 and the same inflated flexible cover 10 from a lateral perspective. A finger-type extension 11r is evident which forms a lateral end portion of the three-dimensional shape. The arrow 13 indicates that inside the outer sheath formed of the finger-type extensions 11 a clearance 13 is formed. An access to the clearance 13 is provided by an opening 14.

Figure 1F:
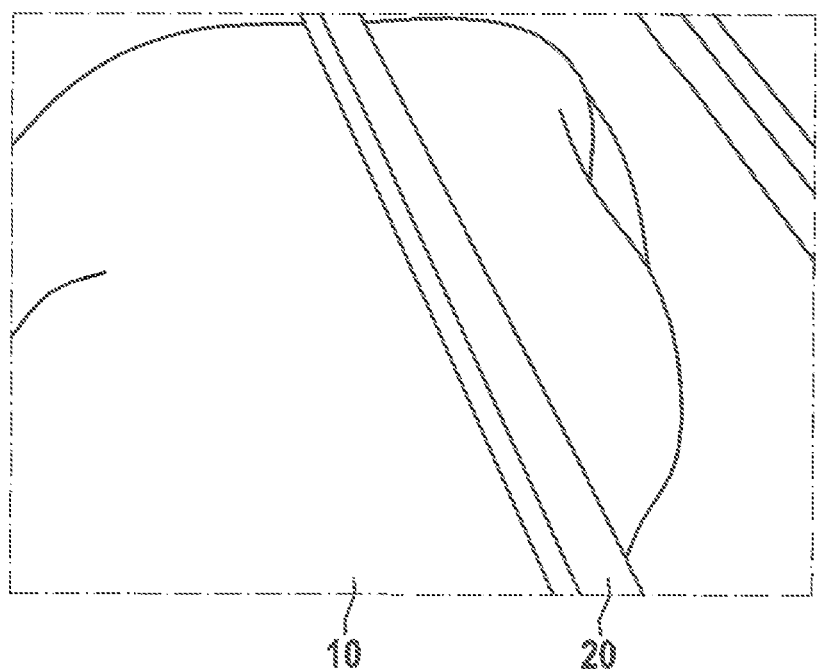

In FIG. 1f the same airbag 1 and, resp., the same flexible cover 10 is shown when viewed from the front, i.e. when viewed through a stylized windshield 20. The flexible cover 10 and, resp., the airbag 1 is dimensioned so that the latter bears on the windshield 20 and, resp., on an A pillar of the vehicle body.

Figure 1G:
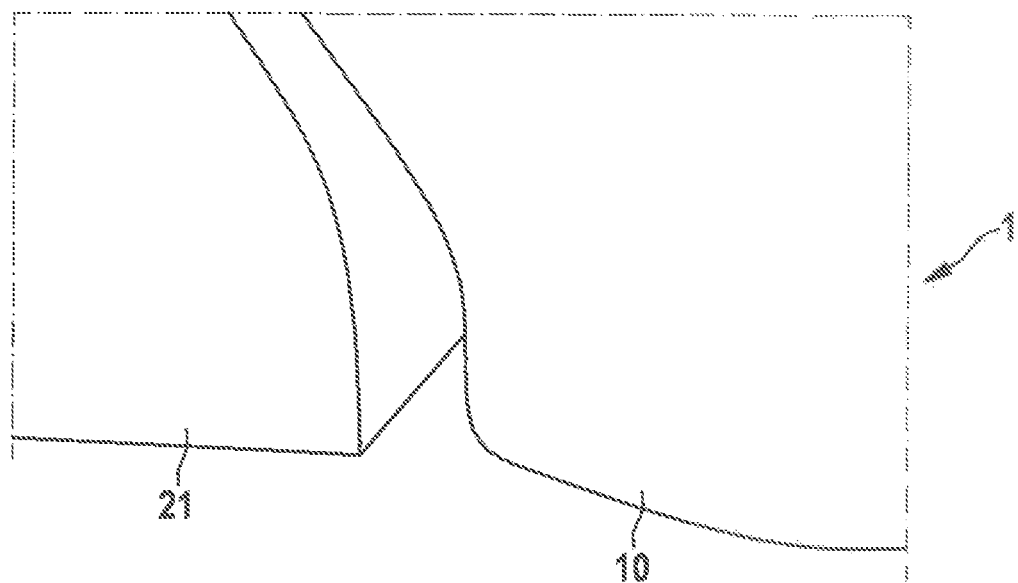

It is resulting from FIG. 1g that, due to the dimensioning of the airbag 1 and, resp., the flexible cover 10, bearing is also possible on the instrument panel 21.

Figure 1H:
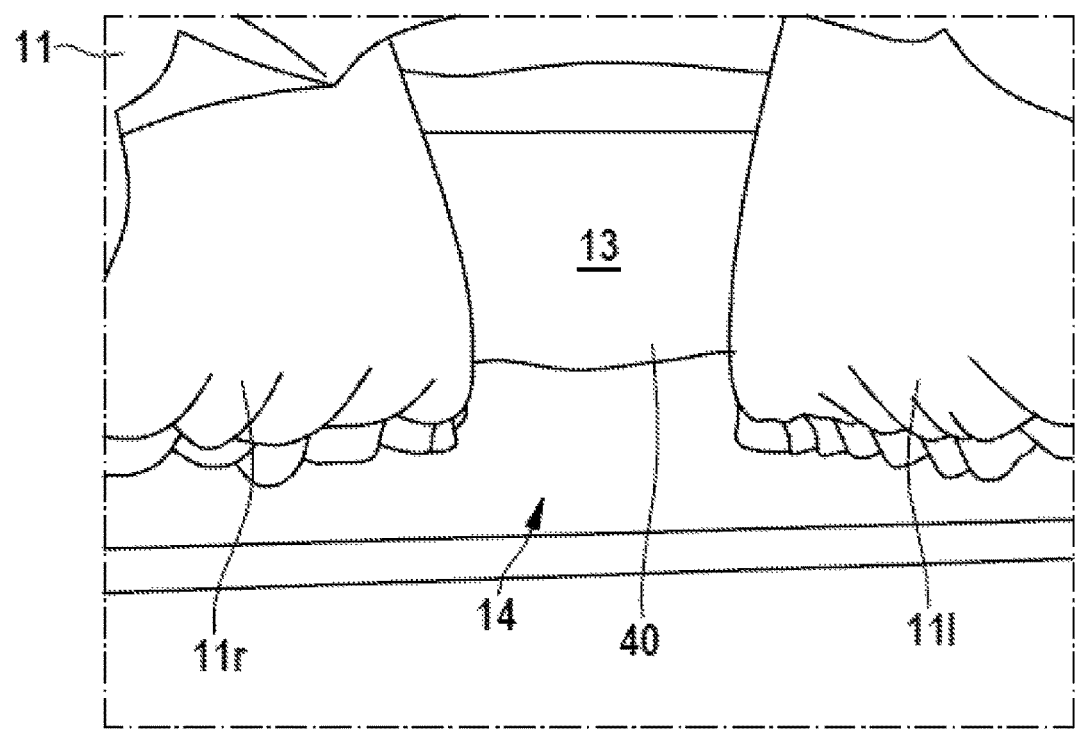

FIG. 1h illustrates the tension element 40. It is connected to the flexible cover 10, especially to two finger-type extensions 11, especially to the two finger-type extensions 11l and 11r which constitute the lateral end portions of the three-dimensional shape formed in the inflated state of the cover 10. The shown angle of view equally indicates that a clearance 13 is formed with the aid of the finger-type extensions. Further finger-type extensions 11 are implicitly shown. The tension element 40 prevents the two finger-type extensions 11l and 11r from being moved apart and rather causes them to be retained in the shown position.

Figure 2:
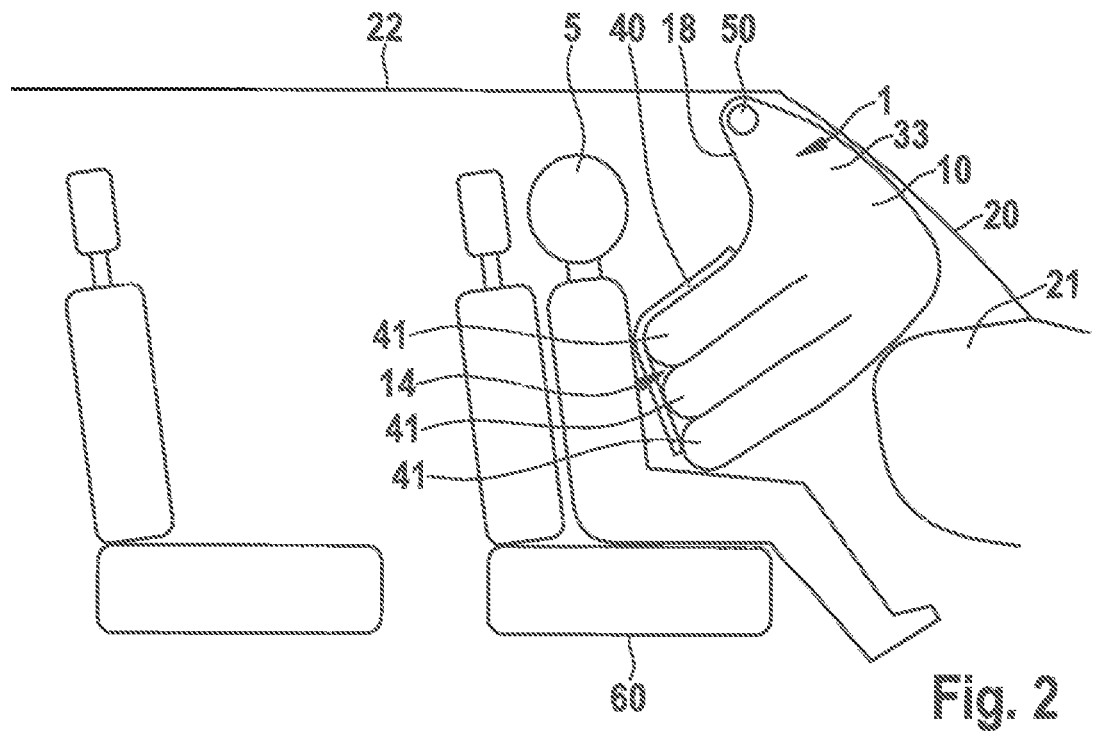
FIG. 2 shows an airbag according to the invention in the form of a so-called bag-in-roof airbag.

In the example illustrated in FIG. 2, the airbag 1 is shown in the inflated state. Said airbag 1 and, resp., the cover 10 is part of a so-called bag-in-roof airbag. Such airbags are formed beneath the roof 22, especially beneath the roof lining in the area below the sun visor. Such airbags 1 can be used both for protecting a driver and for protecting a passenger. The inflator 50 is formed below the roof 22 in the transition to the windshield 20. The flexible cover 10 includes an inflow portion 33, with finger-type extensions 11 being connected to the inflow portion 33. According to FIG. 2, the finger-type extensions 11 are configured such that the opening 14 of the shell shape formed by the flexible cover 10 points in the direction of the vehicle occupant 5, especially of the passenger. In order to prevent the passenger from immersing into the opening 14, a tension element 40 in the form of a tension cloth is formed along with the cover 10. The tension element 40 in this example forms a segment of the outer sheath which delimits the clearance (not shown).

The tension element 40 closes the opening 14 toward the clearance 13 at least in portions. For this purpose, the tension element 40 is connected to a segment of the lower side 18 of the flexible cover 10. Moreover, the tension element 40 is connected to the ends 41 of the finger-type extensions 11, especially stretched over the ends 41 of the finger-type extensions 11. The ends 41 of the finger-type extensions are understood to be the ends that are arranged at a maximum distance from the inflator 50. Thus, the ends 41 are understood to be the fingertip-type ends of the extensions 11.

The vehicle occupant 5, especially his/her head, is prevented from immersing into the openings 14 due to the afore-described attachment of the tension element 40 to the cover 10. Moreover, the cover 10 in the inflated state bears both on a segment of the instrument panel 21 and on a portion of the windshield 20, especially the A pillar of the vehicle body.

Figure 3:
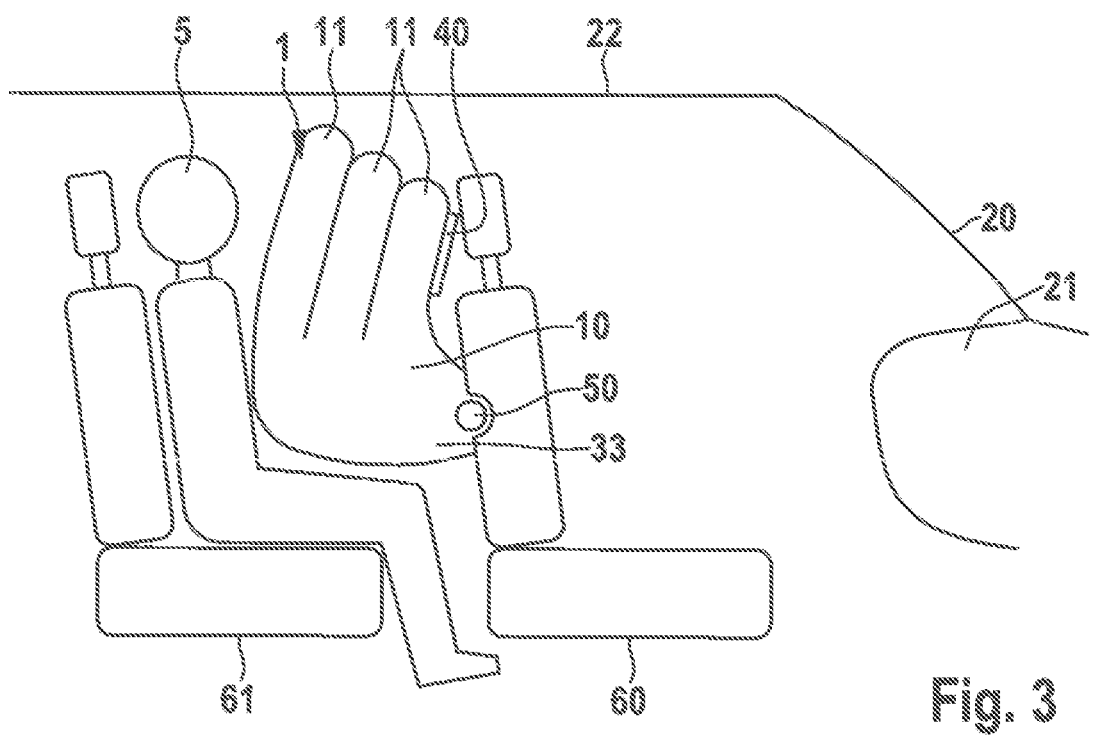
FIG. 3 shows an airbag according to the invention in the form of an airbag for the protection of occupants sitting on the back seat.

In the embodiment according to FIG. 3, the airbag 1 and, resp., the flexible cover 10 is configured as part of a vehicle occupant restraint system which serves especially for the protection of vehicle occupants 5 sitting on a seat 61 of the rear seat row. The inflator 50 in this case is mounted in the backrest of a seat 60 of the front seat row.

The flexible cover 10 in turn includes an inflow portion 33 to which the finger-type extensions 11 are connected. The opening 14 of the flexible cover 10 and, resp., of the three-dimensional flexible cover having an access to the clearance (not shown) points in the direction of the roof 22. In this case, immersion of the head of the vehicle occupant 5 into the opening 14 is not possible. In order to maintain the three-dimensional shape of the airbag 10 even in the case of an impact of the vehicle occupant's head, at least two finger-type extensions 11 are connected to the tension element 40. This is effectuated similarly to the illustration in FIG. 1b.

Figure 4:
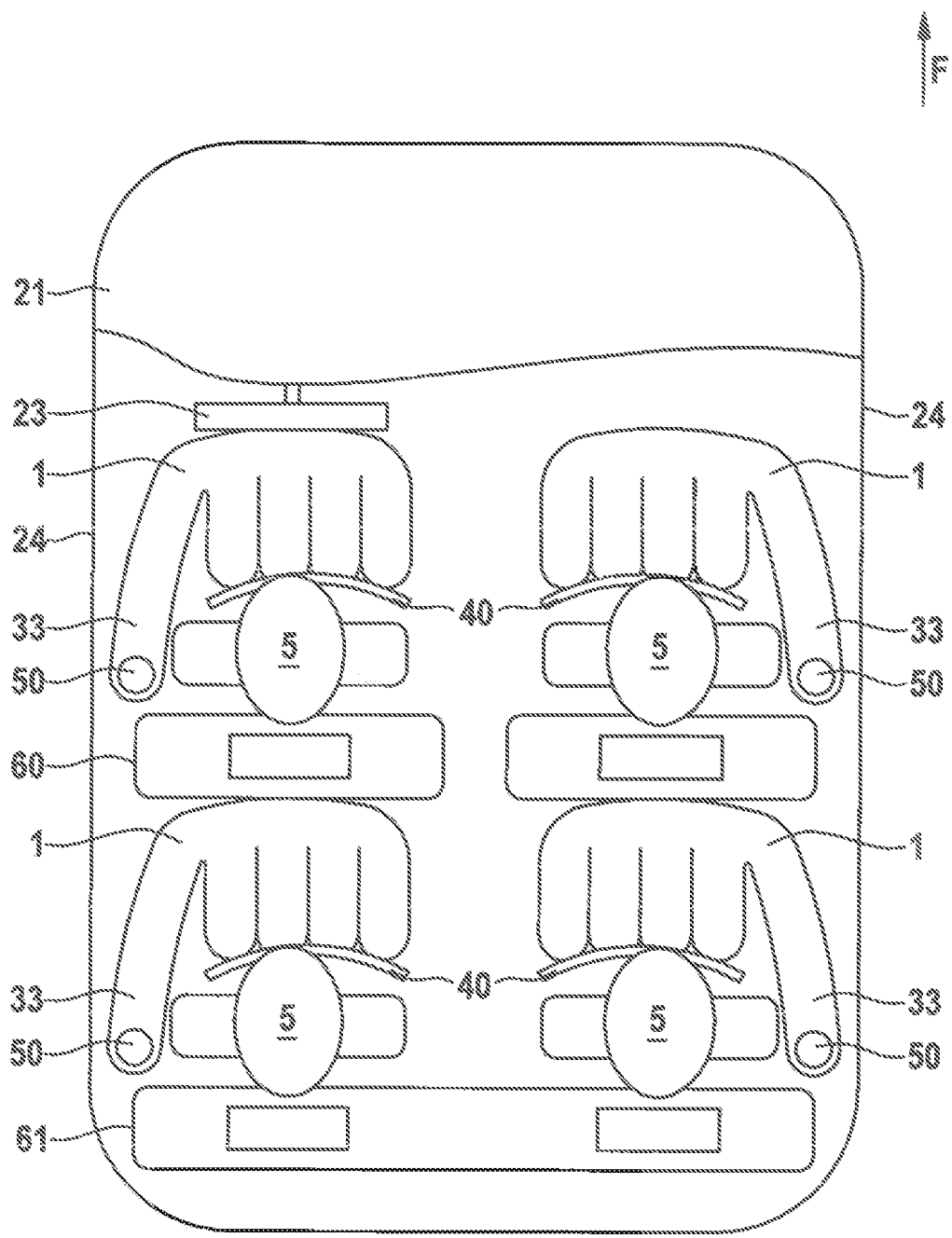
FIG. 4 shows airbags according to the invention in the form of side modules both for the front seat row and for the rear seat row of a vehicle.

FIG. 4 shows that similarly configured airbags 1 and, resp., flexible covers 10 can be used also in connection with side modules. For this purpose, airbags 1 which are adapted to be inflated from the lateral areas 24 of the schematically illustrated vehicle are provided both for protecting the vehicle occupants 5 on the front seats 60 and for protecting the vehicle occupants 5 on the rear seats 61 of the vehicle. For this, the inflators 50 are provided in the linings of the lateral areas 24, for example.

All of the airbags 1 in turn include an inflow portion 33. The finger-type extensions 11 are connected to said inflow portion 33. At all ends 41 of the finger-type extensions 11 a tension element 40 is disposed in the form of a tension cloth. This prevents the vehicle occupants 5 from immersing into the openings 14 of the airbags 1 facing the vehicle occupants 5. With the aid of the inflow portion 33 at first the flexible cover 10 is inflated to the front in the vehicle direction F. Then the finger-type extensions 11 are filled with gas. The finger-type extensions 11 form an outer sheath having a shell-shaped contour, with the outer sheath at least in portions surrounding a clearance (not shown). Access to the clearance 13 is possible merely in the area of the opening 14. With the aid of the tension element 40 the three-dimensional shell shape of the flexible covers is maintained.

Figure 5A:
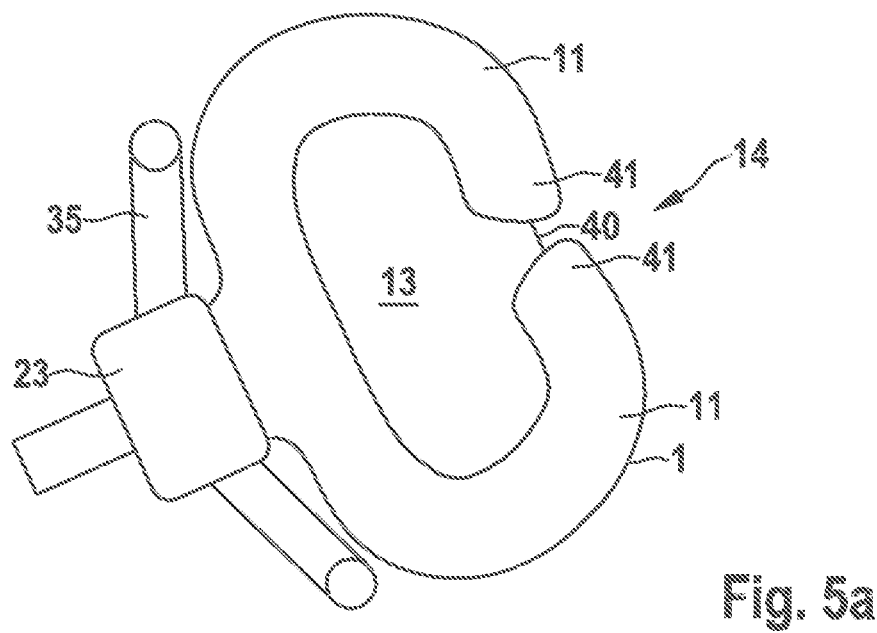
FIG. 5a is a representation of an airbag according to the invention in the form of a driver airbag.

From FIG. 5a an airbag 1 used as driver airbag is evident. For this purpose, in the inflated state the airbag 1 substantially has a C-shaped contour. The C-shaped contour is formed by finger-type extensions 11, wherein the latter delimit a clearance 13.

Figure 5B:
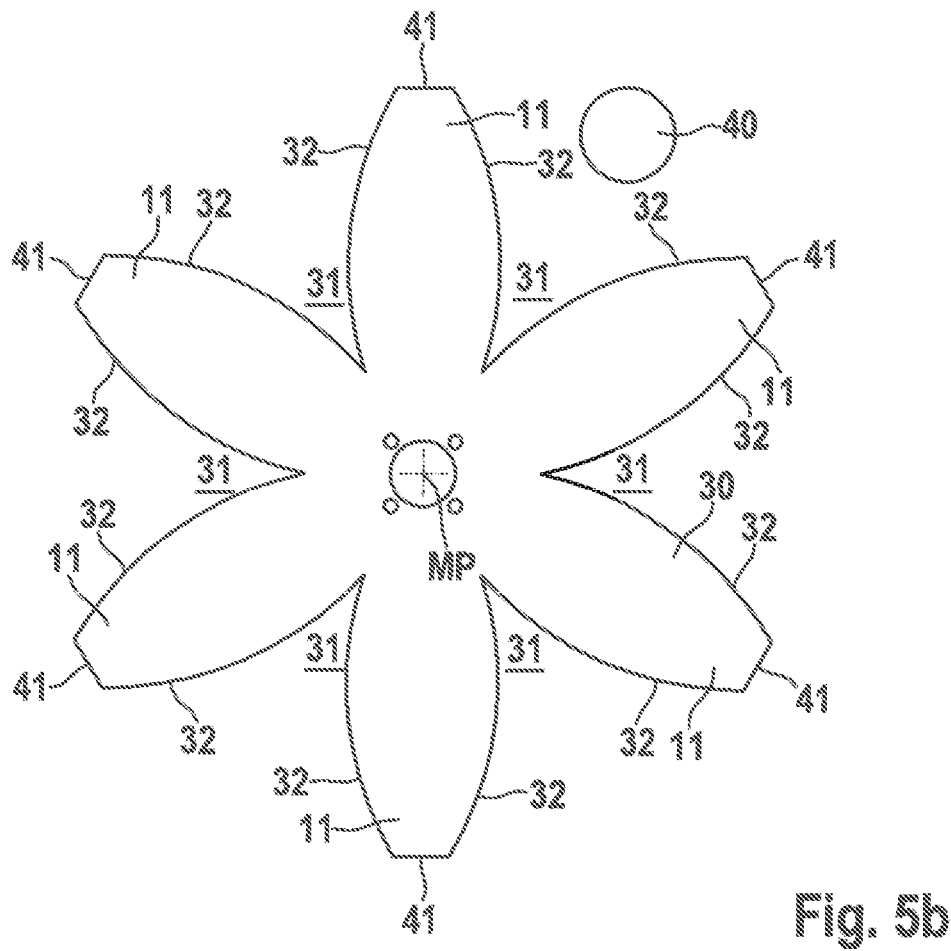

The contour C-shaped in cross-section is obtained by the textile cut 30 (cf. FIG. 5b in this context) comprising a total of six finger-type extensions 11 starting radially from a center MP. The finger-type extensions 11 are substantially flower-shaped. The finger-type extensions 11 have curved edges 32 so that when joining the outer edges 32 the finger-type extensions 11 are urged to take a C shape. In the center MP of the cover 10 the inflator 50 is disposed. Each of the finger-type extensions 11 ends in an end 41. The tension element 40 is connected to said ends 41. Thus, the tension element 40 completely closes off an opening 14 to the clearance 13.

By sewing or generally connecting the finger-type extensions 11 to each other along the entire length thereof, the ends 41 merge in a central portion, with the tension element 40 being formed exactly in said central portion. The airbag 1 is integrated in a steering wheel 23 and, upon activation, inflates ahead of the steering wheel rim 35. The sectional diameter of the airbag 1 is dimensioned so that the airbag 1 in the inflated state bears against the steering wheel rim 35.

Figure 5C:
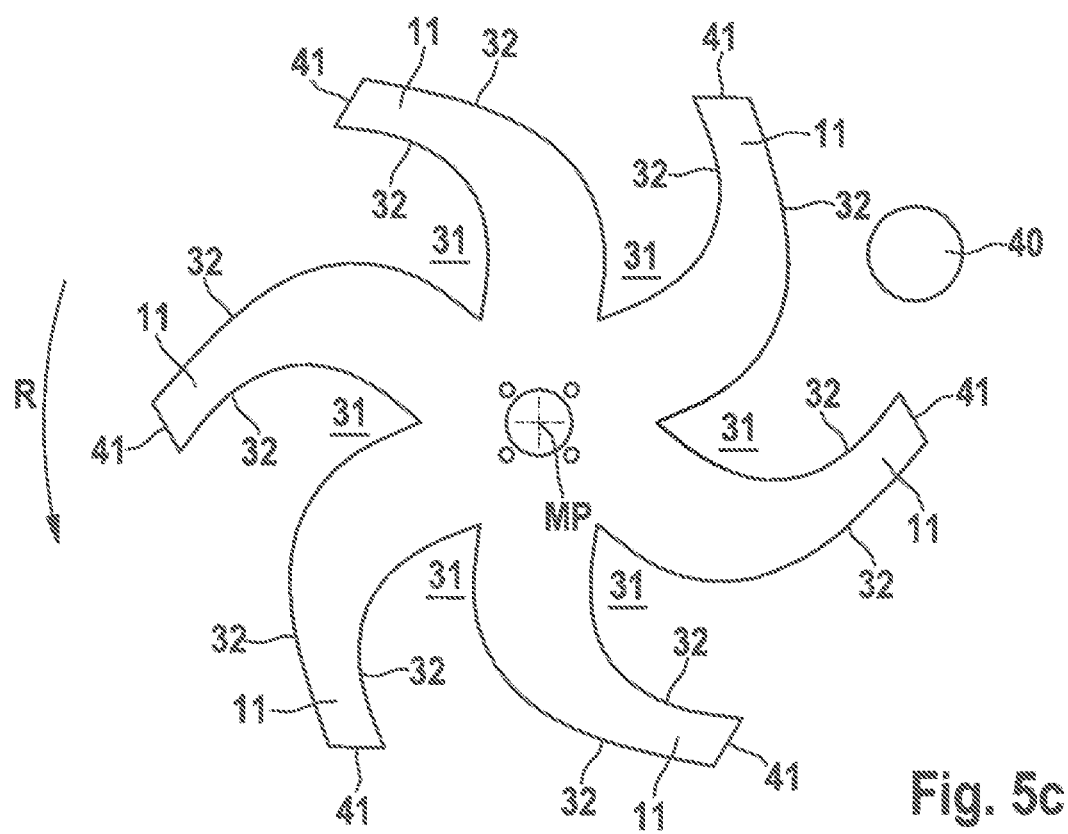

FIG. 5c illustrates another possible form of a textile cut 30. The finger-type extensions 11 form a tan shape, with the finger-type extensions 11 being bent in the direction of rotation R. The finger-type extensions 11 in turn have ends 41. The tension element 40 is connected to said ends 41. The textile cuts 31 are substantially V-shaped, each of them having a curvature, however. The same explanations are applicable here as they have been given already in connection with FIGS. 1a and 1b.

LIST OF REFERENCE NUMERALS 1 airbag
5 vehicle occupant
10 cover
11,11*l*,11*r* finger-type extensions
12 gas expansion compartment
12' gas expansion compartment portion
13 clearance
14 opening
15 opening portion
16 separating seam
17 upper side
19 lower side
20 windshield
21 instrument panel
22 roof
23 steering wheel
24 lateral area
30, 30' textile cut
32 edge
33 inflow portion
35 steering wheel rim
40 tension element
41 end of finger-type extension
50 inflator
60 front seat
61 back seat
F vehicle direction
M center axis
MP center
R direction of rotation

The invention claimed is:

1. An inflatable airbag (1) for protecting a person (5) comprising a flexible cover (10) formed of at least one textile cut (30, 30'), the at least one textile cut (30, 30') including at least two finger extensions (11), each of the finger extensions (11) being spaced apart from each adjacent finger extension (11) by a textile cutout (31) in the at least one textile cut (30, 30') when the flexible cover (10) is in a generally flat configuration, wherein the flexible cover (10) delimits a closed gas expansion compartment (12) by the finger extensions (11), wherein the spaced apart finger extensions (11) are brought together and connected to each other along their edges (32) to close the textile cutout (31) between adjacent finger extensions (11), and wherein in an inflated state of the airbag (1), the finger extensions (11) are interconnected to each other so that the finger extensions (11) are restricted from reaching the generally planar configuration, the airbag (1) takes a three-dimensional shape, and the finger extensions (11) at least in portions delimit a clearance (13), the cover (10) being deformable for absorbing impact energy while deforming the clearance (13).

2. The inflatable airbag (1) according to claim 1, wherein the finger extensions (11) take a star shape or flower shape or fan shape in a manufacturing and generally flat state of the cover.

3. The inflatable airbag (1) according to claim 1, wherein the finger extensions (11) are connected to each other along their entire length.

4. The inflatable airbag (1) according to claim 1, wherein the cover is formed in one part.

5. The inflatable airbag (1) according to claim 1, wherein the cover (10) is formed by at least two textile cuts (30, 30') which are tightly connected to each other at their edges (32) for forming the closed gas expansion compartment (12).

6. The inflatable airbag (1) according to claim 1, wherein in the inflated state, the cover (10) adopts a bowl-shaped or hemispherical or groove-shaped or shell-shaped contour.

7. The inflatable airbag (1) according to claim 1, wherein the cover (10) includes an upper side (17) and a lower side (18), wherein the upper side (17), in the inflated state of the cover, (10) adopts a larger surface area than the lower side (18).

8. The inflatable airbag (1) according to claim 1, wherein in the inflated state the finger extensions (11) form an outer sheath enclosing the clearance (13) at least in portions.

9. The inflatable airbag (1) according to claim 1, having a tension element (40) which is connected to the cover (10), wherein said tension element (40) stabilizes the shape of the clearance (13) in the inflated state of the cover (10).

10. The inflatable airbag (1) according to claim 9, wherein the tension element (40) is a tether or a tension belt or a tension cloth.

11. The inflatable airbag (1) according to claim 9, wherein the tension element (40) is connected to at least two ends (41) of the finger extensions (11).

12. The inflatable airbag (1) according to claim 9, wherein in the inflated state the finger extensions (11) form an outer sheath enclosing the clearance (13) at least in portions, and wherein the tension element (40) forms a segment of the outer sheath.

13. The inflatable airbag (1) according to claim 9, wherein the tension element (40) closes an opening (14) of the clearance (13) at least in portions.

14. The inflatable airbag (1) according to claim 9, wherein the tension element (40) is connected to at least two finger extensions (11*l*, 11*r*) which constitute the lateral end portions of the three-dimensional shape formed in the inflated state of the cover.

15. The inflatable airbag (1) according to claim 9, wherein the tension element (40) is made from gas-permeable material.

16. An airbag module comprising the inflatable airbag (1) according to claim 1 and an inflator (50) connected to said inflatable airbag (1).

17. A vehicle occupant restraint system comprising the airbag module according to claim 16.

18. A method of manufacturing the inflatable airbag (1) according to claim 1, the method comprising:

providing a flexible cover (10) formed of at least one textile cut (30, 30'), the at least one textile cut including a plurality of finger extensions (11), the textile cutouts (31) being formed between said finger extensions (11) so that said finger extensions (11) are spaced apart from each other at least in portions, closing the textile cutouts (31) and connecting adjacent finger extensions (11) to each other for forming a three-dimensionally shaped cover, and connecting a tension element (40) to the cover (10).

19. The method according to claim 18, wherein at least two textile cuts (30, 30') are flatly put on top of each other for providing the cover (10) and the edges (32) of the textile cuts (30, 30') for forming the cover (10).

20. The method according to claim 18, wherein the cover (10) is provided woven in one piece.

21. The inflatable airbag (1) according to claim 1, wherein the cover (10), while deforming when absorbing impact energy, reduces the clearance (13).

22. A vehicle occupant restraint system comprising the inflatable airbag (1) according to claim 1.

23. The inflatable airbag (1) according to claim 1, wherein the closed gas expansion compartment (12) includes a plurality of chambers that are in fluid communication with one another, each of the chambers being defined by one of the finger extensions (11).

* * * * *